US006222529B1

(12) United States Patent
Ouatu-Lascar et al.

(10) Patent No.: US 6,222,529 B1
(45) Date of Patent: Apr. 24, 2001

(54) METHOD AND APPARATUS FOR PROVIDING MULTIPLE SESSIONS ON A SINGLE USER OPERATING SYSTEM

(75) Inventors: Mircea Ouatu-Lascar, Orangevale; Nagesh Rao, Fair Oaks; Venkatesh Iyer, Folsom; Murali Padmanabhan, Fair Oaks; Loren Ross Mahannah, Belmont, all of CA (US)

(73) Assignee: Shareware, Inc., El Dorado Hills, CA (US)

( * ) Notice: Subject to any disclaimer, the term of this patent is extended or adjusted under 35 U.S.C. 154(b) by 0 days.

(21) Appl. No.: 09/305,863

(22) Filed: May 5, 1999

(51) Int. Cl.[7] ........................................... G06F 3/14
(52) U.S. Cl. ..................... 345/326; 345/335; 709/327; 709/328; 709/201
(58) Field of Search ..................... 345/329, 331, 345/333, 335; 709/327, 201, 203, 321, 323, 328

(56) References Cited

U.S. PATENT DOCUMENTS

| 5,371,890 | 12/1994 | Bozman et al. ........................... 7/10 |
| 5,515,538 | 5/1996 | Kleiman ................................ 710/260 |
| 5,715,464 | 2/1998 | Crump et al. ........................... 713/323 |
| 5,784,615 | 7/1998 | Lipe et al. ............................... 709/301 |
| 5,819,156 | 10/1998 | Belmont .................................... 455/2 |
| 5,842,226 | 11/1998 | Barton et al. ........................... 711/203 |
| 5,909,540 | 6/1999 | Carter et al. ............................... 714/4 |
| 5,913,230 | 6/1999 | Richardson ............................ 711/203 |
| 5,918,229 | 6/1999 | Davis et al. ............................. 707/10 |
| 5,987,506 | 11/1999 | Carter et al. ............................ 709/213 |
| 6,023,749 | 2/2000 | Richardson ............................ 711/203 |
| 6,075,938 | 6/2000 | Bugnion et al. ................. 395/500.48 |

OTHER PUBLICATIONS

Windows NT (Microsoft Corp.'s operating system) Unix review, V:2, N4 P63 (4): Kennedy, Randall C. : Apr. 1994.
Q&A OS/2 Wrap Connect. Sternke, Steve: Lan Magazine, V10, N8, P56 (5): Aug. 1995.
PCT, Search Report, PCT/US000/12443.

*Primary Examiner*—Raymond J. Bayerl
*Assistant Examiner*—Thomas T. Nguyen
(74) *Attorney, Agent, or Firm*—Blakely Sokoloff Taylor & Zafman LLP

(57) ABSTRACT

A set of operating system extensions that allow a single user operating system to support multiple users is disclosed. The extensions operate by creating multiple sets of operating system environments by copying a number of operating system variables that define the current operating system state. In a two user embodiment, a local personal computer console state is created for the user at the personal computer console and a remote console system state is created for a user at a remote console coupled to the personal computer system. A special virtual device driver then hooks into the operating system such that the special virtual device driver will be called before any thread switch. The special virtual device driver will load the proper operating system environment variables for the application that will be executed next. The operating system extensions also handle all input and output requests in a special manner. When the operating system extensions are initialized, a set of drivers is loaded for each user. The operating system extensions then hook all input and output operating system calls such that all the operating system extensions direct all input and output requests from applications run by a user at the personal computer console are directed toward the normal set of personal computer device drivers but all input and output requests from applications run by another user at another console are directed toward a set of device drivers for that user's console.

16 Claims, 5 Drawing Sheets

METHOD AND APPARATUS FOR PROVIDING MULTIPLE SESSIONS ON A SINGLE USER OPERATING SYSTEM

FIELD OF THE INVENTION

The present invention relates to the field of personal computer operating systems. In particular the present invention discloses methods for providing multiple individual user sessions that are controlled with remote hardware on an operating system designed only to support a single user.

BACKGROUND OF THE INVENTION

The currently available personal computer systems are equipped with large memory systems and high-speed processing power that was unavailable just a few years ago. The large memory and improved processing power has mostly been put to use in Graphical User Interfaces (GUI) implemented by windowing operating systems such as Microsoft's Windows and Apple Computer's MacOS. The graphical user interfaces simplify the operation of the personal computer system such that many people now use personal computer systems.

However, even with graphical user interface based operating systems, there is still plenty of processing power in most personal computer systems that is not being used. For example, when a user is reading a display screen, the personal computer system's processor is usually idle. Other times when the processor is idle include waiting for input/output devices to complete operations, times when the processor is waiting for an input from the user, times when the user is not using the personal computer system at all, and times when the user is waiting for information to be delivered across a slow network connection. In fact, the processors within most personal computer systems are idle for the majority of the time.

Since there is a large amount of unused processing power available in most personal computer systems, it would be desirable to be able to share this unused processing power with one or more other persons. However, most personal computers use the Windows 95 or Windows 98 operating systems that only provide input and output services for a single console. With the Windows 95 and Windows 98 operating systems, only one person can use the personal computer system. This is true despite the fact that the Windows 95 and Windows 98 operating systems are multi-tasking operating systems that can support several simultaneous application tasks. Thus, it would be desirable to find a way of sharing the processing power in a Windows 95 or Windows 98 based personal computer with other user at other consoles that are coupled to the personal computer system.

SUMMARY OF THE INVENTION

The present invention introduces a set of operating system extensions that allow a single user operating system to support multiple users. The operating system extensions of the present invention hook into an existing single user operating system such that additional users may be supported.

The present invention operates by creating multiple sets of operating system environments by copying a number of operating system variables that define the current operating system state. In a two user embodiment, a local personal computer console state is created for the user at the personal computer console and a remote console system state is created for a user at a remote console coupled to the personal computer system. A special virtual device driver then hooks into the operating system such that the special virtual device driver will be called before any thread switch. The special virtual device driver will load the proper operating system environment variables for the application that will be executed next.

The operating system extensions of the present invention also handle all input and output requests in a special manner. When the operating system extensions are initialized, a set of drivers is loaded for each user. The operating system extensions then hook all input and output operating system calls. Input and output operating system calls are handled by the operating system extensions such that all input and output requests from a user at the personal computer console are directed toward the normal set of personal computer device drivers. However, all input and output requests from a user at another console coupled to the personal computer system are directed toward a set of device drivers for that users console.

Other objects, features, and advantages of present invention will be apparent from the company drawings and from the following detailed description.

BRIEF DESCRIPTION OF THE DRAWINGS

The objects, features and advantages of the present invention will be apparent to one skilled in the art, in view of the following detailed description in which.

DETAILED DESCRIPTION OF THE PREFERRED EMBODIMENT

A method and apparatus for providing multiple individual user sessions that are controlled with remote hardware on an operating system designed only to support a single user is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to Windows 95 and Windows 98. However, the same techniques can easily be applied to other types of single user operating systems.

A Shared Personal Computer System

The majority of personal computers sold today are sold with an operating system from Microsoft (over 85%). The most popular current Microsoft operating system is Windows 98. Windows 98 is an improved version of Windows 95 personal computer operating system. Both the Windows 95 and Windows 98 operating systems are multitasking operating systems that designed to be used by a single user sitting at a single personal computer console.

However, most current personal computer systems sold today provide far more computing power than is consumed by most personal computer system users. Due to the single user limitation of the Windows 95 operating system and the Windows 98 operating system, it is currently not possible to share this extra computing power with another user. To remedy this situation, the invention introduces a set of extensions to the Windows 95 and Windows 98 operating systems that allow another user at another console to share the processing power of a single personal computer system running the Windows 95 or Windows 98 operating system.

Figure 1:
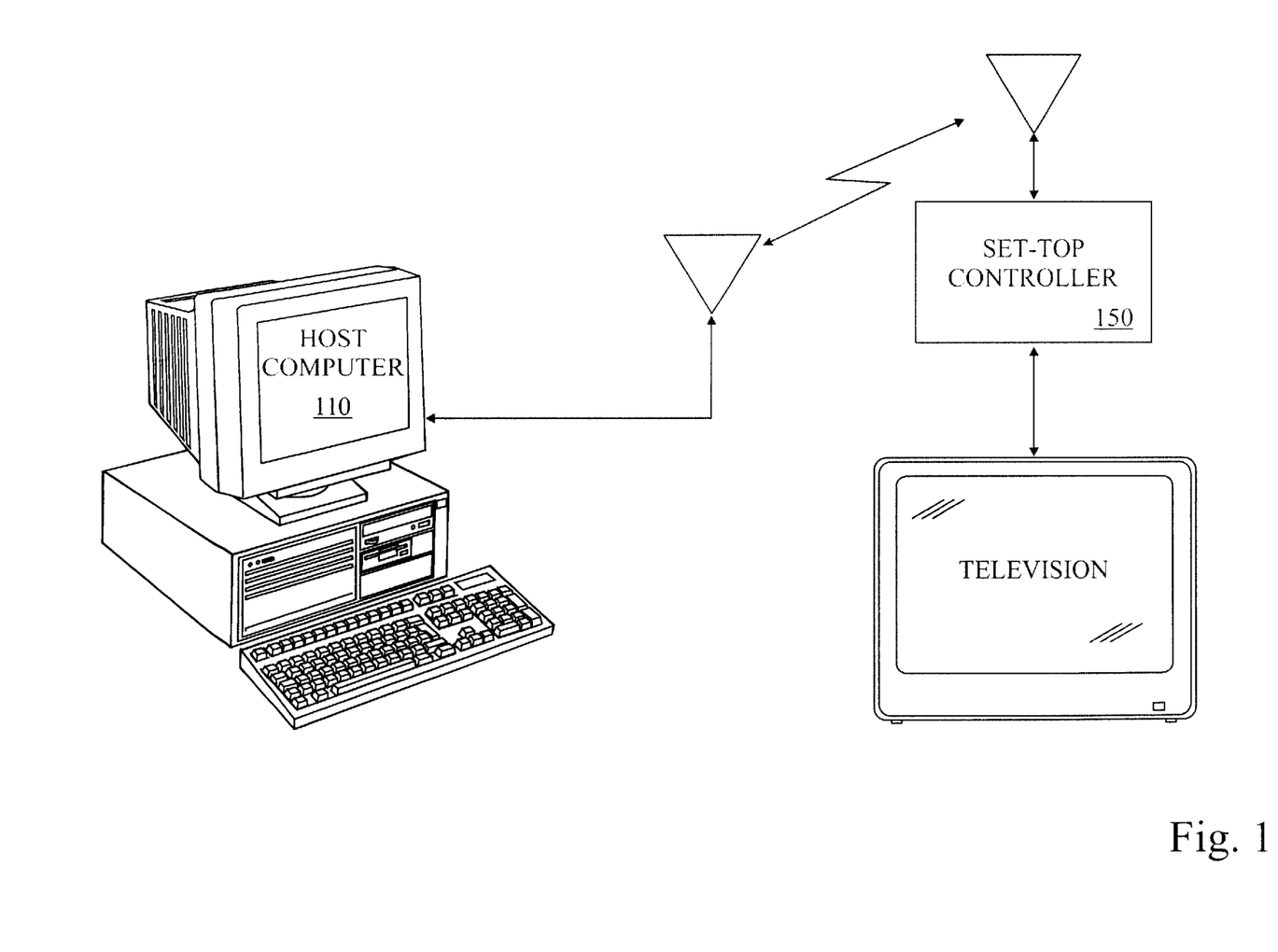
FIG. 1 illustrates a personal computer system with a second console coupled to it using a wireless link.

FIG. 1 graphically illustrates the overall architecture of the set of extensions to the Windows 95 and Windows 98 operating systems that allow another user at another console to share the processing power of a single personal computer system. As illustrated in FIG. 1, a main user operates a personal computer system 110 running the Windows 95 or Windows 98 operating system. The main user controls a first set of execution threads that have their output displayed on a main monitor coupled to the personal computer 110. The personal computer 110 may be a home computer system used to perform family financial planning and Internet browsing. Due to relatively slow human interactions, limited bandwidth Internet connections, and other factors, the processor in the personal computer system 110 will be idle most of the time that the main user operates the personal computer system 110.

To share the processing power of the personal computer 110, the present invention introduces a set of hooks into the Windows 95 or Windows 98 operating system that cause a second set of execution threads to respond to commands from a second console 150 coupled to the personal computer 110. Similarly, the visual and audio output from the second set of execution threads is delivered to and output on the second console 150 coupled to the personal computer 110. In one embodiment, the second console 150 comprises a set-top box coupled to a television that is wirelessly coupled to custom hardware in the personal computer 110.

Multiple User Software Architecture Overview

The Windows 95 and Windows 98 operating systems use a set of protection mechanisms (mostly Ring 0 and Ring 3) offered by the Intel Architecture microprocessors (Ring 0, Ring 1, Ring 2, and Ring 3). The Ring 0 provides the greatest freedom of operation and Ring 3 provides the greatest protection.

Figure 2:
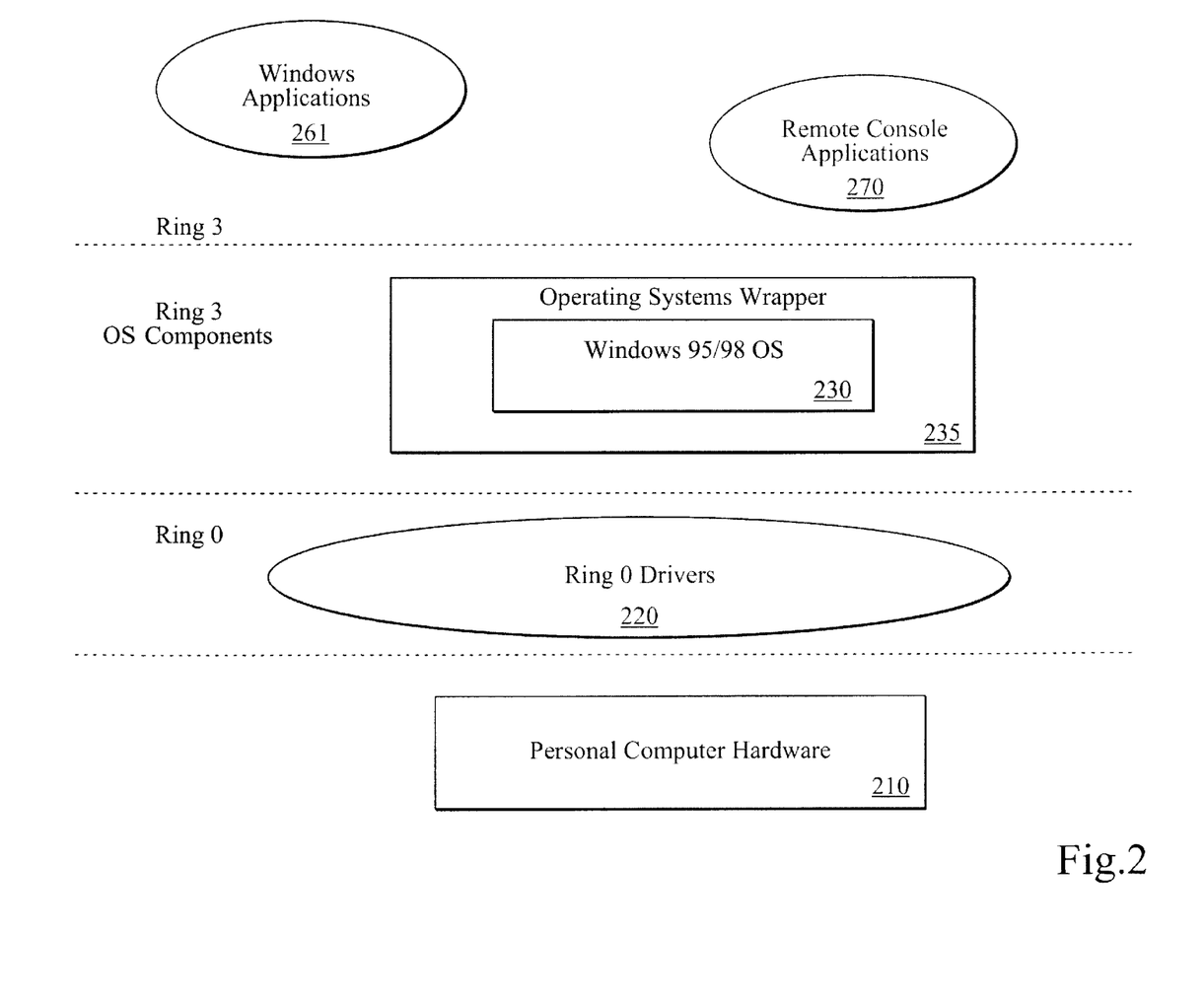
FIG. 2 illustrates a conceptual diagram of a personal computer system running the Windows 95/98 operating system.

FIG. 2 illustrates a conceptual diagram of a personal computer system running the Windows 95/98 operating system. As illustrated in FIG. 2, the hardware 210 of a personal computer system running the Windows 95/98 operating system 230 includes a set of Ring 0 device drivers 210. The Windows 95/98 operating system 230 controls the personal computer hardware 210 using the set of Ring 0 device drivers 210. Most portions of Windows 95/98 run in the Ring 3 protection level. Furthermore, sets of Windows Applications 261 also run in Ring 3 on top of the Windows 95/98 operating system 230.

To run a set of application threads for a second user sitting at a second console, the present invention places a "wrapper" 235 around the Windows 95/98 operating system 230.

The operating system wrapper 235 intercepts key requests from application programs to the Windows 95/98 operating system 230. The operating system wrapper 235 decides how the intercepted key requests should be handled and may redirect the requests to custom operating system routines. Thus, many operating system requests from the remote console applications 270 are handled in a special manner by the operating system wrapper 235 of the present invention. In addition to the operating system wrapper 235, the present invention may further provide one or more device driver wrappers that intercept requests from the Windows 95/98 operating system 230 to certain Ring 0 device drivers 210.

Detailed Multiple User Software Architecture

Figure 3:
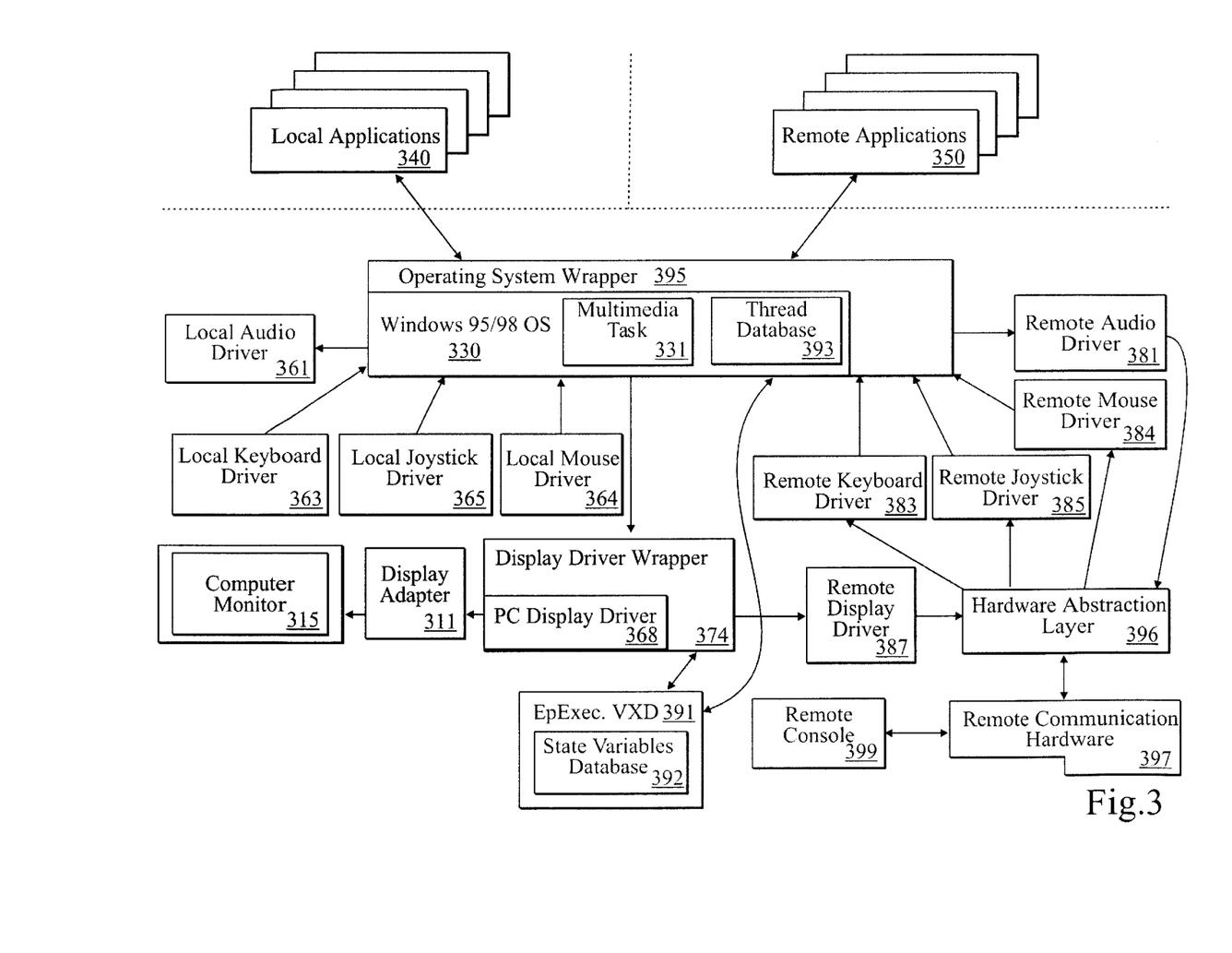
FIG. 3 illustrates a block diagram of the software architecture for sharing a single personal computer system running the Windows 95/98 operating system with another user at a remote console.

FIG. 3 illustrates a detailed view of a software architecture for a multiple user extension system for a single user operating system. In the software architecture of FIG. 3, the user applications have been divided into two different groups: local applications 340 and remote applications 350.

The local applications 340 run normally. Specifically, the local applications 340 accept input from local input devices coupled directly to the personal computer system and display their output on the local personal computer monitor.

The remote applications 350 are "invisible" to a local user at the personal computer console. The remote applications accept input from remote devices coupled to a remote console. In one embodiment, the remote console is coupled to the personal computer console with custom hardware. Similarly, the remote applications 350 display their output on monitor coupled to the remote console unit.

Local and Remote System State

To control the two different user environments, the present invention maintains different sets of operating system "state" variables. In a two user embodiment, only two sets of operating system state variables are maintained. However the present invention can easily be extended to accommodate additional users by maintaining additional sets of operating system state variables. This document will focus on a two user system to simplify the description of the Windows 95/98 based multi-user personal computer system.

The state variables are maintained in a state variables database 392 by a special virtual device driver known as the EpExec virtual device driver 391. The EpExec virtual device driver 391 performs a number of functions to allow multiple users to a share a single Windows 95/98 based personal computer system. The EpExec virtual device driver 391 is launched when a remote device session is initiated.

To handle application threads from multiple different users, the EpExec virtual device driver 391 requests the operating system to inform the EpExec virtual device driver 391 whenever a thread switch occurs. In one embodiment, the EpExec virtual device driver 391 performs this thread by registering a thread switch call-back address that will be called just before the operation system performs a thread switch.

When the EpExec virtual device driver 391 is notified of a thread switch, the EpExec virtual device driver 391 notes which application thread that is being activated. The EpExec virtual device driver 391 determines the application environment of the application thread being activated and stores that value into a global variable known as the current application environment value. If the application thread being activated belongs to a local application 340 then the EpExec virtual device driver 391 loads a set of local system state variables from state variables database 392. Similarly, if the application thread being activated belongs to a remote application 350 then the EpExec virtual device driver 391 loads a set of remote system state variables from state variables database 392.

Local and Remote Device Drivers

Both the local applications 340 and the remote applications 350 communicate with the Windows 95/98 operating system 330 through the operating system wrapper 395. When the operating system wrapper 395 receives a request from an application thread, the operating system wrapper 395 first determines if the requesting application thread belongs to a local application 340 or belongs to a remote application 350. In one embodiment, the operating system wrapper 395 determines the application environment by examining the global current application environment value maintained by the EpExec virtual device driver 391. In another embodiment, the operating system wrapper 395 can send a request to the EpExec virtual device driver 391 wherein the operating system wrapper 395 requests to learn whether the current thread belongs to a local application 340 or a remote application 350. Once the operating system wrapper 395 has determine the current application environment, the operating system wrapper 395 responds to the operating system request in a manner that depends on the current application environment. Specifically, the operating system wrapper 395 will ensure that the proper driver is used to respond to the operating system request.

As set forth in FIG. 3, the adapted version of the Windows 95/98 operating system 330 relies on a set of local drivers 361, 363, 364, and 365 to communicate with a local audio device, keyboard, mouse, and joystick respectively. When a thread belonging to local application 340 is active, these local device drivers are used to handle input/output requests. The local drivers may affect the local system state variables. However, since the local drivers are only active when a thread from a local application 340 is active and the local system state variables are loaded, the local drivers will only affect the local system state variables.

When a remote application is active a different set of remote device drivers 381, 383, 384, and 385 are used. In one embodiment, the remote device drivers 381, 383, 384, and 385 communicate with a hardware abstraction layer 396 that controls all communication with the remote console device. The hardware abstraction layer 396 may communicate with a remote communication interface card 397. In a preferred embodiment, the remote communication interface card 397 communicates across a wireless link with a remote console device 399 coupled to a television (not shown). All input from the remote console device 399 is relayed to the hardware abstraction layer 396 through the remote communication interface card 397. The remote input is then passed to the remote device drivers 381, 383, 384, and 385. Any changes to system state resulting from remote input will only affect the remote system state variables in the state variables database 392 since the remote device drivers are only active when a remote application 350 is currently active.

Handling Display Requests

All display requests from the Windows 95/98 operating system 330 are directed to a display driver wrapper 374 that surrounds the personal computer display device driver 368 for the personal computer's display card 311 that drives the personal computer's monitor 315. Specifically, the display driver wrapper 374 intercepts all display requests directed toward the Application Program Interface (API) of the personal computer display device driver 368.

When a display request originates from a local application 340, then the display driver wrapper 374 must render the images on the personal computer's monitor 315 using the personal computer display device driver 368 and the personal computer's display adapter 311. Similarly, if the display request originates from a remote application 350, then the display driver wrapper 374 must render the images on the remote system 399 by forwarding such requests to a remote display driver 387. The remote display driver 387 interprets the display requests and renders the images for display on the monitor of the remote system 399. In one embodiment, the remote display driver 387 communicates with the monitor of the remote system 399 using a hardware abstraction layer 396 for the remote system 399. The hardware abstraction layer 396 passes the rendered the image for the remote monitor of the remote system 399 using communication hardware that couples the personal computer system to the remote system 399.

To determine the source of each display driver request, the display driver wrapper 374 examines the global current application environment value maintained by the EpExec virtual device driver 391 in order to determine the user application thread that is currently active when a display request was made. If the global current application environment value specifies that the currently active application thread is from a local application 340 then the display request is passed to the personal computer's standard display device driver 368. Otherwise, if the global current application environment value specifies that the currently active application thread is a remote application 350 then the display request is passed to the remote display driver 387.

Initialization of the Multiple User Operating System Extensions

In order adequately inform the reader on how the multiple user software architecture of FIG. 3 operates, this section describes the multiple user operating system extensions are initialized.

To create two individual user environments, the present invention introduces a few operating system extensions that are loaded during the computer system boot phase. These boot phase operating system extensions must be loaded during the boot phase since the Windows 95/98 operating systems sets a number of operating system parameters during the boot-up that cannot be subsequently changed without rebooting. Additional multi-user operating system extensions will later be loaded into the operating system if and when a user initiates a remote session from a remote console. The general initialization procedure of the multiple user extension system is described in the flow diagram illustrated in FIG. 4.

Boot Phase Initialization

Figure 4:
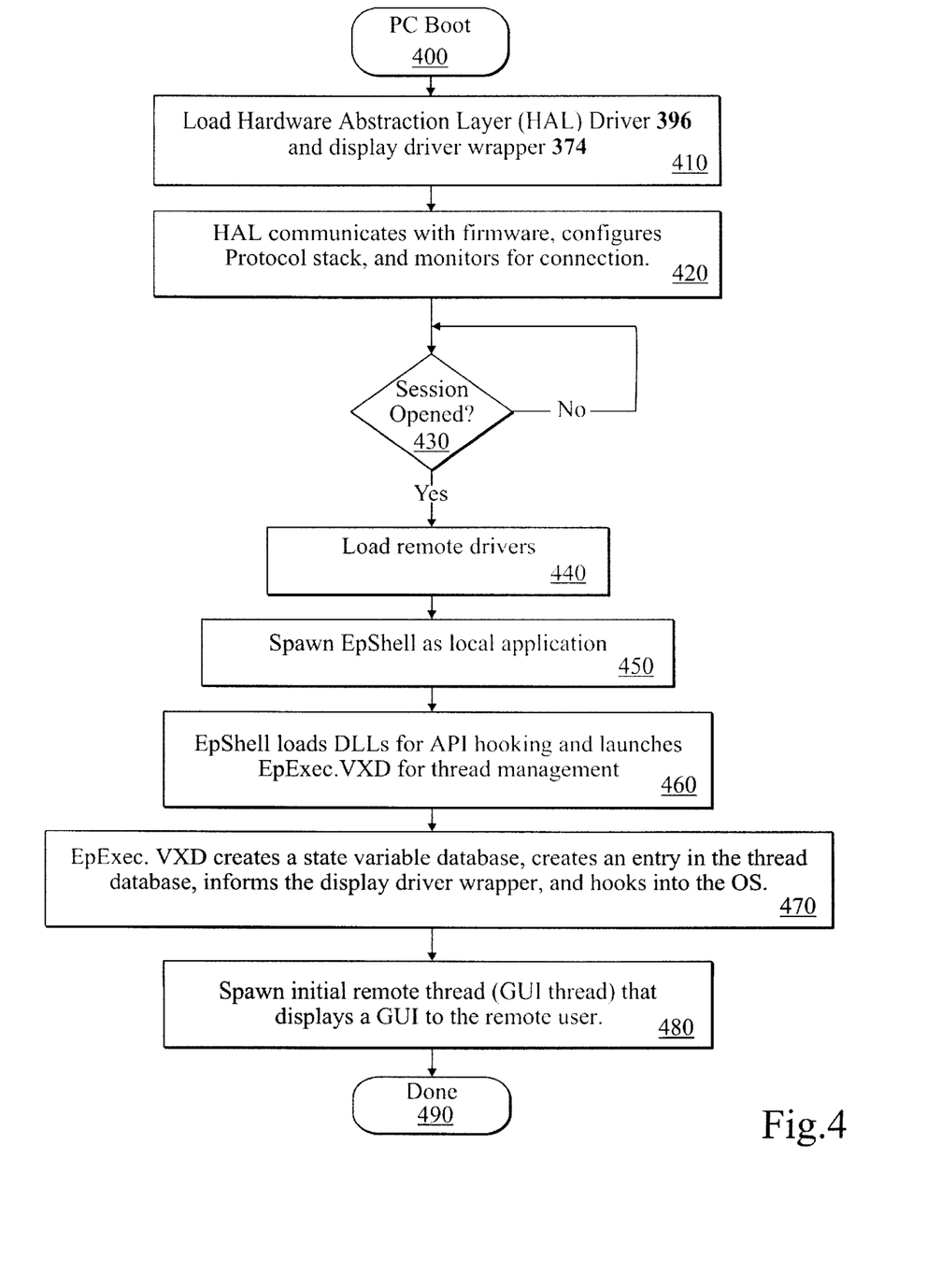
FIG. 4 illustrates a flow diagram that describes the boot process of the multi-user OS extensions.

Referring to the initialization flow diagram of FIG. 4, the personal computer begins the operating system boot up phase at step 400. During the operating system boot phase, the operating system loads all the necessary drivers. In order to allow additional user environments to be created, the multiple user system of the present invention loads the hardware abstraction layer driver 396 and the display driver wrapper 374 at step 410.

The display driver wrapper 374 is loaded before the personal computer's normal display driver 368. The display driver wrapper 374 hooks the Windows 95/98 operating system 330 calls into the operating system display driver routines such that the display driver wrapper 374 is called whenever the operating system has a display request. When the display driver wrapper 374 needs the services of the normal display driver 368 for display requests originating from local users, then the display driver wrapper 374 will call the normal display driver 368. All display requests will be passed to the normal display driver 368 until a remote user session is created.

The hardware abstraction layer driver 396 is also loaded during the boot phase to control the remote communication hardware 397. The hardware abstraction layer driver 396 communicates with the remote communication hardware 397 and establishes a protocol stack for communicating with the remote system 399 as set forth in step 420 of FIG. 2. The hardware abstraction layer driver 396 then monitors the remote communication hardware 397 to see if the remote system 399 opens a user session on the personal computer as stated in steps 420 and 430. If no remote session is initiated, then no further action is taken. By loading only a few drivers during the boot phase, the present invention allows the multiple user extensions to have a minimal effect on the existing operating system until a second user session is opened.

Remote User Environment Creation

When a remote system attempts to start a remote user session, the hardware abstraction layer 396 is informed. In one embodiment where the remote communication hardware 397 is coupled to the remote system 399 through a wireless communication link, the hardware abstraction layer 396 first authenticates the remote system. If the authentication fails, then the hardware abstraction layer 396 ignores the rogue remote system.

When an authenticated remote system 399 opens a session, the hardware abstraction layer 396 begins to add additional operating system extensions needed to support multiple users. Initially, at step 440, the hardware abstraction layer 396 loads in all the device drivers needed to support the remote system 399. For example, in the embodiment of FIG. 3 the hardware abstraction layer 396 loads remote device drivers 381, 383, 384, and 385.

Next, at step 450, the hardware abstraction layer 396 spawns a local application program, EpShell launcher, that will continue the initialization of the multi-user operating system extensions. The EpShell launcher first loads in a set of dynamically linked libraries for API hooking as stated in step 450. In one embodiment, EpShell launcher loads an EpExec16.DLL for handling 16-bit Windows applications and an EpExec32.DLL for handling 32-bit Windows applications. The dynamically linked libraries then hook into certain Windows operating system calls such that the dynamically linked libraries form the operating system wrapper 395. Thus, when certain operating system routines are called, the operating system wrapper 395 routines in the dynamically linked libraries will be invoked instead of the normal operating system routine.

EpExec Virtual Device Driver Initialization

The EpShell launcher then launches the important EpExec virtual device driver 391 at step 460. The EpExec virtual device driver 391 performs a number of critical functions needed to implement multiple user sessions.

At step 470, the EpExec virtual device driver 391 starts by creating a state variable database 392 that will store sets of operating system state for each user session. In a two user embodiment, the state variables database 392 stores two sets of operating system state: a local system state and a remote system state. The local operating system state is created by cloning a set of needed operating system variables currently used by the personal computer's operating system into the local system state entry in the state variable database 392. The local operating system state will be used for all local applications 340. The remote operating system state is created by copying some of the needed operating system variables into the remote system state and initializing other remote system state variables using a pre-defined initial remote system state. The remote system state will be used for all remote applications 350.

Next, the EpExec virtual device driver 391 creates a private entry in the thread database 393 that contains console affinity information about all the threads executing in the Windows 95/98 operating system 330 environment. Specifically, the EpExec virtual device driver 391 creates a four byte console affinity identifier in the console affinity database 393. The console affinity identifier specifies which user application environment (local or remote) the application thread is running in. When the EpExec virtual device driver 391 creates the new entry in the console affinity database 393, all the currently existing thread entries are defined as "local" application threads that belong to the local personal computer console user.

The launcher application (EpShell.exe) then informs the display driver wrapper 374 that a remote user environment has been created. Thus, from this point onward the display driver wrapper 374 must now examine all incoming display requests to determine if such requests are from local threads or remote threads. The display driver wrapper 374 must then direct the display requests originating from local threads to the personal computer display driver 368 and direct display requests originating from remote threads to the remote display driver 387.

Finally, the EpExec virtual device driver 391 installs a thread switch callback hook into the Windows 95/98 operating system 330 by informing the Windows 95/98 operating system 330 that a particular address in the EpExec virtual device driver 391 should be called when ever a thread switch occurs. By requesting this thread switch call-back from the Windows 95/98 operating system 330, the EpExec virtual device driver 391 will be able to set up the proper user environment before any new application thread begins executing.

The First Remote Application

After the EpExec virtual device driver 391 has initialized itself, the EpShell launcher then spawns an initial remote application thread at step 480. The initial remote application thread will be presented to the user of the remote system console 399. The newly created initial remote application thread informs the EpExec virtual device driver 391 that the initial remote application thread is an application thread that should be placed into the remote application environment 350 category. The EpExec virtual device driver 391 updates the private entry in the thread database 393 for the initial remote application accordingly such that one remote application 350 now exists. All output from the initial remote application will be displayed on the remote system 399 and all inputs from the initial remote application will be serviced by the remote device drivers.

In one embodiment, the initial remote application thread is a launcher application known as remoteGUI. The remote-GUI application thread presents a graphical user interface to the user of the remote system 399 that allows additional remote application threads to be launched.

From this point onward, any application that is spawn by any existing application thread will be placed into the same application environment (local or remote) of its parent application. Thus, the EpExec virtual device driver 391 will designate any application launched from the initial remote application (remoteGUI) as a remote application 350. Similarly, the EpExec virtual device driver 391 will also designate any application spawned by an existing local application 340 as a local application 340.

Operation of the Multiple User Operating System Extensions

After the multi-user operating system extension system initialization disclosed in FIG. 4 has completed, the computer system resumes normal processing. The operating system environment remains the same except that the EpExec virtual device driver 391 is called before every thread switch and certain operating system calls are intercepted by multi-user operating system extensions (the operating system wrapper 395 and the display driver wrapper 374). Each of these altered procedures is described in the following subsections.

Thread Switch Handling

Figure 5A:
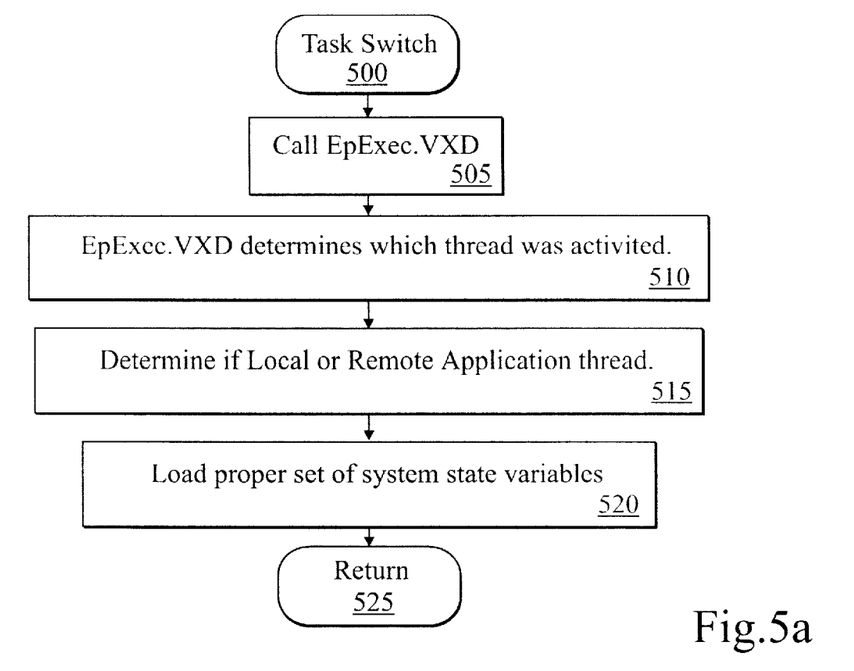
FIG. 5*a* illustrates a flow diagram that describes what functions the EpExec virtual device driver performs when a thread switch occurs.

FIG. 5A describes what occurs during each thread switch. Referring to step 500 a thread switch has been initiated by the Windows 95/98 operating system 330. Due to the callback installed, the Windows 95/98 operating system 330 calls the EpExec virtual device driver 391 before each thread switch as stated in step 505.

At step 510, The EpExec virtual device driver 391 queries the Windows 95/98 operating system 330 to determine which application thread is being activated. At step 515, the EpExec virtual device driver 391 then examines the thread database 393 in the Windows 95/98 operating system 330 to determine which user environment the activated thread belongs in. Specifically, the EpExec virtual device driver 391 examines the added private entry in the thread database 393. Using this information, the EpExec virtual device driver 391 loads the appropriate set of operating system state variables into the operating system 330 from the state variable database 392. After the appropriate operating system state has been loaded, the EpExec virtual device driver 391 returns control to the Windows 95/98 operating system 330 at step 525. The Windows 95/98 operating system 330 will proceed to execute the newly activated thread in the proper operating environment.

Application Requests Into The Operating System Wrapper

As set forth in previous section describing the initialization of the multiple user operating system extensions, a number of operating system routines are hooked such that multi-user operating system extensions routines in the operating system wrapper 374 are invoked when the hooked operating system routines are called by applications. The hooked operating system routines are input & output routines.

The multi-user operating system extension routines in the operating system wrapper 374 examine each application request to see if it is a local or remote application at step 515. Specifically, the operating system wrapper 374 examines the private thread identifier entry in the thread database 393 that specifies if a thread is a local thread or a remote thread. The operating system wrapper 374 then handles the operating system requests accordingly. For example, input requests from the local applications will be directed to the local device drivers 363, 364 and 365 and input requests from remote applications are directed to the remote device drivers 383, 384, and 385.

Operating System Requests Into The Display Driver Wrapper

In the Windows 95/98 operating system 330, user applications do not directly access the display hardware or display drivers directly. Instead, the user applications make display requests into the Windows 95/98 operating system 330. The Windows 95/98 operating system 330 then makes the display requests into the display driver that has been loaded by the Windows 95/98 operating system 330.

In the present invention, the normal display driver 368 has been surrounded by a display driver wrapper 374 that will receive all display requests. Since display requests into the display driver wrapper 374 do not come directly from the user applications, the display driver wrapper 374 does not know if a particular display request should be drawn on the local user's display device or on the remote user's display device. To handle this problem, in a preferred embodiment, the display driver wrapper 374 consults the global current application environment value maintained by the EpExec virtual device driver 391. The current application environment value informs the display driver wrapper 374 if it should use the PC display driver 368 or the remote display driver 387.

Figure 5B:
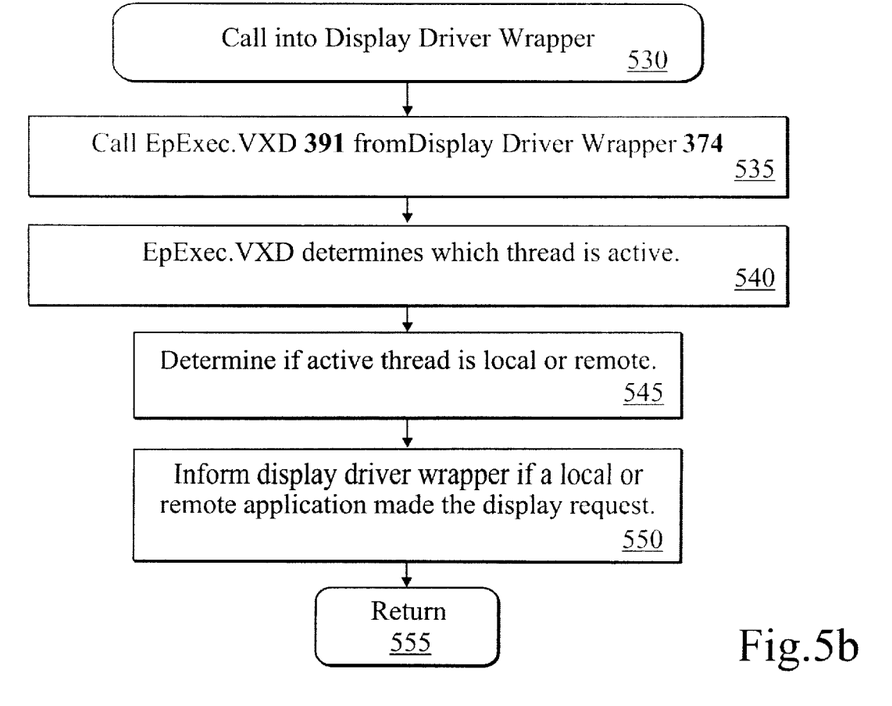
FIG. 5*b* illustrates a flow diagram that describes how a display device driver wrapper and the EpExec virtual device driver handle requests to access the computer systems display.

In an alternate embodiment, the display driver wrapper calls the EpExec virtual device driver 391 to make the determination. FIG. 5B describes how the display driver wrapper 374 and the EpExec virtual device driver 391 cooperate to handle display requests. Referring to step 530, the display driver wrapper 374 is called when the Windows 95/98 operating system 330 needs to display information. The display driver wrapper 374 then calls into the EpExec virtual device driver 391 to determine the origin of the display request at step 535. At step 540, the EpExec virtual device driver 391 examines the thread database 393 in the Windows 95/98 Operating system 330 to determine which application thread is currently active. After locating the active thread, the EpExec virtual device driver 391 determines which user environment the active application belongs in, at step 545. In the two user system, the active application thread is either a local thread or a remote thread. Finally, at step 550, the EpExec virtual device driver 391 informs the display driver wrapper 374 if the user application that made the request is a local application or a remote application. Control then returns to the display driver wrapper 374 which that handles the display request accordingly.

Multimedia Requests

In the Windows 95/98 operating system 330, some operating system requests are handled in a synchronous manner instead of an asynchronous manner. Such requests include multimedia requests such as soundwave and MIDI playback. A special multimedia thread 331 handles such requests. The present invention must ensure that the proper operating system environment is in place when the multimedia thread 331 handles such requests.

To handle synchronous requests, the present invention places a hook into the multimedia thread 331 that tags each multimedia request with an identifier which identifies the source application of the request as local or remote. Later, when the multimedia thread 331 makes a service call to get information before performing the requested action, the EpExec virtual device driver 391 is activated to ensure that the proper user environment is loaded. Specifically, the EpExec virtual device driver 391 examines the tag placed on the multimedia request to determine if its origin was from a local or remote application. The EpExec virtual device driver 391 then loads the proper operating environment.

The foregoing has described a set of multi-user extensions to a single user operating system. It is contemplated that changes and modifications may be made by one of ordinary skill in the art, to the materials and arrangements of elements of the present invention without departing from the scope of the invention.

We claim:

1. A method of supporting multiple users on a computer system with a single user operating system, said method comprising:

copying a set of operating system state variables from a first user environment into a first user system state;

creating a second set of operating system state variables for a second user environment in a second user system state;

activating a section of code when ever a thread switch occurs; and loading said first user system state into said operating system if a first application in said first user environment is to be executed else loading said second user state into said operating system if an second application in said second user environment is to be executed.

2. The method as claimed in claim 1, said method further comprising:

creating an application thread identifier in a thread database, said application thread identifier specifying if a corresponding application thread is in said first user environment or said second user environment.

3. The method as claimed in claim 1, said method further comprising:

loading a first set of device drivers for said first user environment;

loading a second set of device drivers for said second user environment; and directing a subset of operating system calls from applications in said second user environment to said second set of device drivers.

4. The method as claimed in claim 1 wherein said second user environment is for a set of applications controlled by a remote console coupled to said computer system.

5. The method as claimed in claim 4 wherein said remote console is coupled to said computer system with a wireless data communication link.

6. The method as claimed in claim 1, said method further comprising:

creating an operating system wrapper around said operating system that intercepts a subset of operating system calls from applications on said computer system.

7. The method as claimed in claim 1, said method further comprising:

creating a display driver wrapper around a display device driver in said computer system, said display driver wrapper intercepting display requests from said operating system.

8. The method as claimed in claim 1, said method further comprising:

loading a device driver for controlling a hardware communication interface in said computer system that communicates with a second console device coupled to said hardware communication interface.

9. An computer apparatus for sharing a computer system running a single user operating system with additional users, said computer apparatus comprising:

a computer system;

a remote console communication interface coupled to said personal computer system;

a remote console coupled to said remote console communication interface;

an operating system running on said computer system; and a set of operating system extensions, said operating system extensions creating multiple operating system environments by copying a set of operating system variables into multiple operating system state entries in a operating system state database, said operating system extension ensuring that a proper operating system environment isolated before each thread switch.

10. The apparatus as claimed in claim 9, wherein said operating system extensions create an application thread identifier in a thread database, said application thread identifier specifying if a corresponding application thread is in a first operating system environment or a second operating system environment.

11. The apparatus as claimed in claim 9, said apparatus further comprising:

a first set of device drivers for a first operating system environment;

a second set of device drivers for a second operating system environment; wherein said operating system extensions direct a subset of operating system calls from applications in said second operating system environment to said second set of device drivers.

12. The apparatus as claimed in claim 9 wherein one of said operating system environments is for a set of applications controlled by a remote console coupled to said computer system.

13. The apparatus as claimed in claim 9 wherein said remote console is coupled to said remote console communication interface with a wireless data communication link.

14. The apparatus as claimed in claim 9, said apparatus further comprising:

an operating system wrapper, operating system wrapper intercepting a subset of operating system calls from applications on said computer system.

15. The apparatus as claimed in claim 9, said apparatus further comprising:

a display driver wrapper, said display driver wrapper intercepting display requests from said operating system.

16. The apparatus as claimed in claim 1, said apparatus further comprising:

a device driver for controlling said remote console communication interface in said computer system that communicates with said remote console.

* * * * *

UNITED STATES PATENT AND TRADEMARK OFFICE
CERTIFICATE OF CORRECTION

PATENT NO. : 6,222,529 B1  
DATED : April 24, 2001  
INVENTOR(S) : Ouata-Lascar et al.

It is certified that error appears in the above-identified patent and that said Letters Patent is hereby corrected as shown below:

<u>Title page,</u>  
Item [73] delete "Shareware, Inc." and insert -- Sharewave, Inc. --

Signed and Sealed this

Twenty-first Day of May, 2002

Attest:

JAMES E. ROGAN  
*Attesting Officer*     *Director of the United States Patent and Trademark Office*